Jan. 21, 1958 E. D. PHILBRICK, JR 2,820,688
DIGITAL DIFFERENTIAL ANALYZER MAGNETIC DRUM
Filed Sept. 10, 1952 2 Sheets-Sheet 1

INVENTOR:
EVERETT D. PHILBRICK, JR.

By Herbert E. Metcalf
HIS PATENT ATTORNEY

Jan. 21, 1958 E. D. PHILBRICK, JR 2,820,688
DIGITAL DIFFERENTIAL ANALYZER MAGNETIC DRUM
Filed Sept. 10, 1952 2 Sheets-Sheet 2
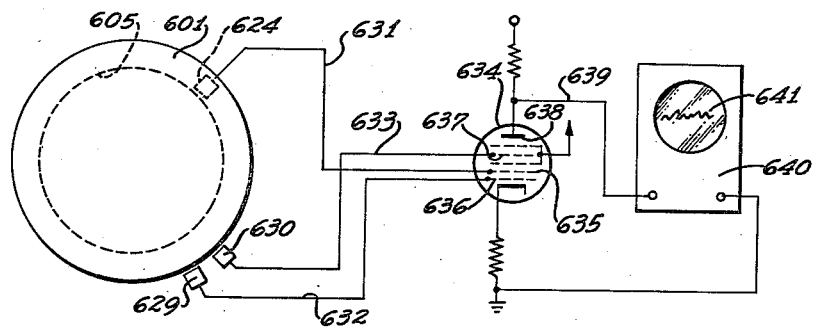
Fig. 4.
Fig. 3.
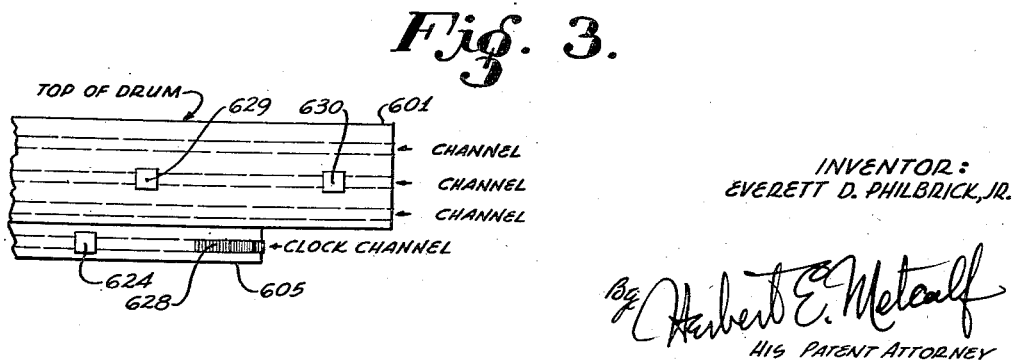
INVENTOR:
EVERETT D. PHILBRICK, JR.
By Herbert E. Metcalf
HIS PATENT ATTORNEY

United States Patent Office 2,820,688
Patented Jan. 21, 1958

2,820,688

DIGITAL DIFFERENTIAL ANALYZER MAGNETIC DRUM

Everett D. Philbrick, Jr., Beverly Hills, Calif., assignor to Northrop Aircraft, Inc., Hawthorne, Calif., a corporation of California Application September 10, 1952, Serial No. 308,784

6 Claims. (Cl. 346—74)

This invention relates to computers, and, more particularly to a novel magnetic drum used in performing the process of differential analysis.

It is an object of this invention to provide a novel memory arrangement for information.

Briefly, the present invention comprises a magnetic wheel functioning as a dynamic storage.

Figure 3 illustrates the disposition of the several channels of magnetic recordings for the embodiment shown in Figures 1 and 2.

Figure 4 schematically illustrates one embodiment for properly positioning the magnetic heads around the magnetic memory drum.

Figure 1:
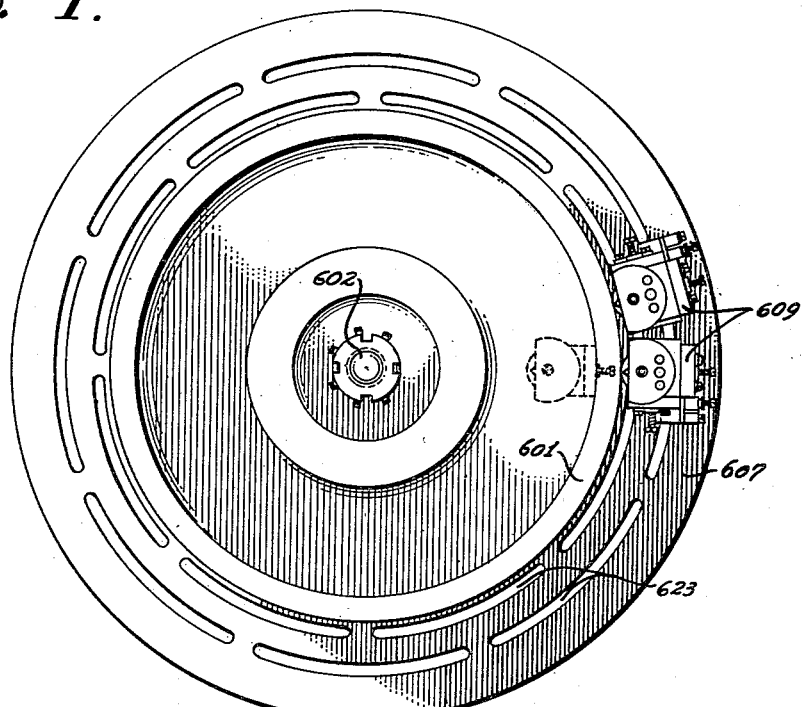
Figure 1 is a plan view of the magnetic memory drum assembly.
Figure 2:
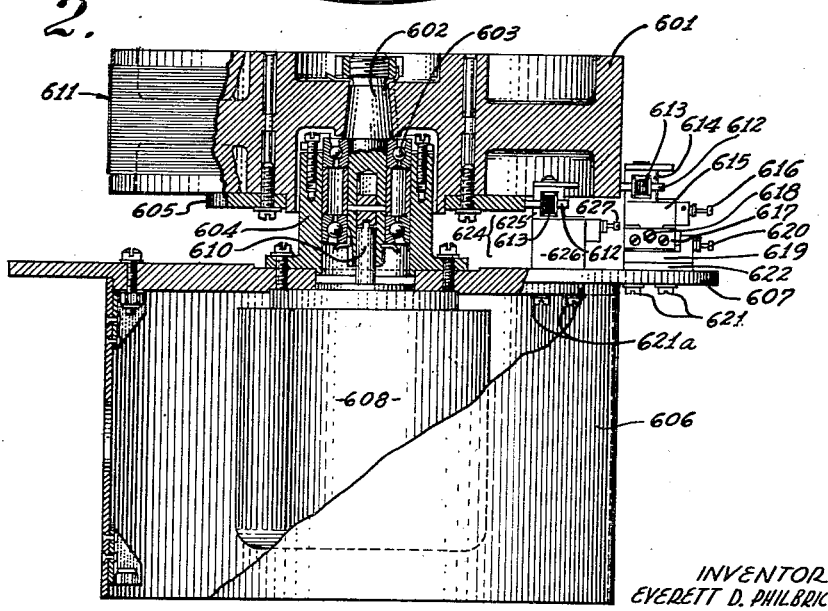
Figure 2 is an elevation view, partly sectional, of the magnetic drum assembly.

A preferred embodiment of the magnetic wheel will now be described. Referring to Figures 1 and 2, a magnetic wheel 601 is firmly attached to a wheel shaft 602. Bearing assembly 603 is disposed between the wheel shaft 602 and a bearing housing 604 such as to minimize the friction between the shaft and housing while providing for rotation with a minimum of transverse motion of the shaft with respect to the housing. A second wheel 605 is firmly attached to the wheel 601 and is concentric with it. Disposed between and firmly attached to the bearing housing 604 and to a support 606 is a circular plate 607. Circular plate 607 is a support for a motor 608 and provides a means for mounting magnetic head assemblies 609. A motor shaft 610 is properly connected to the wheel shaft 602 to cause cooperative rotation between the two. In one embodiment, the wheel 601 is revolved at a speed of 4,750 R. P. M.

The periphery of wheel 601 is coated with a magnetizable suspension 611; such a suspension may consist of iron oxide powder in a shellac vehicle. In constructing the present invention, the wheel 601, the wheel shaft 602, the bearing assembly 603, the bearing housing 604, and the second wheel 605 may be mounted in a lathe such that the entire assembly can be rotated as a unit. A drive center in the spindle of the lathe may be used to replace the motor shaft 610. The assembly is rotated and wheel 601 and second wheel 605 are machined at their periphery to obtain a nearly true circular shape. An application of the magnetizable suspension is made to the periphery of wheel 601. Thereafter wheel 601 is lightly machined to insure that the exposed magnetizable surface is a section of a right circular cylinder with the axis of rotation of the wheel 601 at the center of such a cylinder. Second wheel 605 may likewise be coated with a magnetizable layer and thereafter lightly machined.

Magnetic head assemblies 609 are disposed about the periphery of wheel 601. Referring to Figure 2 for a description of each head assembly, a head core 612 with a head coil 613 is supported by means of head core support 614. Head core support 614 is in turn slidably attached to an upper block 615. A radial adjustment screw 616 is threaded through upper block 615 and bears against head core support 614 such that rotation of the screw results in a translation motion of the head core 612 in a direction normal to a tangent line to the surface of wheel 601. Upper block 615 is slidably attached to a middle block 617. A rotation of a tangential adjustment screw 618, which is threaded through middle block 617 and bears against upper block 615, results in a translation motion of upper block 615 in a direction parallel to a tangent line for the surface of wheel 601.

A rotatable connection is made between middle block 617 and a lower block 619. Rotation motion between middle block 617 and lower block 619 is caused by a rotation of a rotational adjustment screw 620 which is threaded through lower block 619 and bears against middle block 617. Finally lower block 619 is bolted to the plate 607 by means of positioning screws 621. Lower block 619 may be fashioned to a desired thickness or a spacer 622 may be disposed between lower block 619 and plate 607 to position head core 612 a desired distance from the plate 607. Positioning screws 621 pass through slots 623 in plate 607, thereby enabling a rough angular positioning of the magnetic head assemblies 609 about wheel 601.

All sliding and rotating connections between elements of the magnetic head assemblies are spring loaded such that one member constantly bears against an adjusting screw, thereby providing adjustment in two directions per adjusting screw.

A single magnetic head 624 is associated with second wheel 605. The single magnetic head 624 consists of a head core 612, a head coil 613, a single head core support 625, and a single lower block 626. Translation motion, radially from second wheel 605, of the single head core support 625, with respect to the single lower block 626, results from a rotation of a single radial adjustment screw 627. Single lower block 626 is firmly mounted to the plate 607 by means of positioning screws 621a.

The magnetic heads employed in the preferred embodiment are of a commercial design and are well known in the magnetic recording art.

In operation, the preferred embodiment of the present invention is employed as a dynamic memory device. Such a dynamic memory device has an application in computers wherein a multiplicity of memory or delay channels are desired. For application in a computer, the magnetic head assemblies 609 may be disposed about the periphery of the magnetic wheel in a fashion as shown in Figure 4. The positioning of channels of information along the height of the wheel is arbitrary; one channel arrangement is shown in Figure 3.

In placing the magnetic heads about the magnetic wheel at desired angular positions, the circuit shown in Figure 4 may be employed. Referring to Figures 3 and 4, a clock pulse read head 624 is located to read in the clock channel of the second wheel 605. A first read head 629 and a second read head 630 are the magnetic heads to be positioned a desired angular distance apart. A continuous magnetic pulse recording is made in the clock channel on the second wheel 605 that is scanned by the clock pulse read head 624.

As the magnetic wheel 601 rotates, a continuous pulse output will occur from the clock pulse read head 624 and will be applied to one grid 635 of a vacuum tube 634 by means of a clock pulse line 631.

The magnetic pulse recorded in the channel of the first and second read heads 629 and 630 causes pulse outputs into a first pulse line 632 and a second pulse line 633 as a pulse passes the heads. First and second pulse lines 632 and 633 transmit these pulses to a second and third grid 636 and 637, respectively, of vacuum tube 634. An output is taken from an anode 638 through tube output line 639 and applied to an oscilloscope 640. A visual indication of the input to the oscilloscope 640 is given on an oscilloscope screen 641.

The aforementioned clock pulses are, initially, a closed loop recording of magnetic pulses on second wheel 605. A gear wheel having fine gear teeth 628 (Figure 3) may be employed as a clock pulse generator in place of the magnetic coating on second wheel 605. The single magnetic head 624 would then be used to generate a clock pulse each time one of the gear teeth 628 passed the magnetic head.

Since a source of clock pulses is necessary as a synchronizer in many electronic computers, the clock pulse channel if recorded on a second wheel is permanent and after once recorded can remain regardless of what may be done to the first wheel. An index head, such as is employed with a milling machine in cutting gear teeth, may be used to rotate the magnetic wheel through small angles in order to record each pulse of the clock channel.

The radial adjustment screw 616, tangential adjustment screw 618, and the rotational adjustment screw 620 are utilized to advantage in obtaining a precise adjustment of position of a magnetic head with respect to the magnetic wheel 601.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In a computer having a mounting base and magnetic head assembly supported therefrom and positioned in co-operative relationship with a moving recording channel, a head support assembly comprising a plurality of superposed blocks each having spring-loaded adjustment screw means for moving one of its adjacent blocks in a respectively different relative path, said head support assembly being attached as a support medium between said mounting base and said magnetic head assembly, whereby said magnetic head assembly can be adjusted in all directions relative to said recording channel.

2. In combination, a cylinder, a magnetizable coating disposed on the surface of the cylinder, means for supporting the cylinder, means for rotating the cylinder, at least one magnetic head assembly held by the supporting means in cooperative relationship with the magnetizable coating, a plurality of blocks positioned on the supporting means in stacked relationship and in juxtaposition to the cylinder, a magnetic head supported by the blocks and responsive to the pattern of magnetization provided on the coating, and a plurality of adjustable screws extending through predetermined blocks and in engagement with the blocks adjacent to the predetermined blocks to move the magnetic head in predetermined directions relative to the periphery of the cylinder.

3. In combination, a cylinder, a magnetizable coating provided on the periphery of the cylinder, a motor for driving the cylinder, a housing for the motor, a plate supported on the housing, a plurality of blocks supported in stacked relationship on the plate, adjustable spring-loaded screws extending through each of the blocks to press against an adjacent block, one of the screws being positioned to move its adjacent block in a tangential direction with respect to the periphery of the cylinder, another of the screws being positioned to move its adjacent block in a radial direction with respect to the periphery of the cylinder, and a third screw being positioned to move its adjacent block in an angular direction with respect to the periphery of the cylinder, and a magnetic head supported by the blocks in contiguous relationship to the coating on the cylinder to produce signals in accordance with the pattern of magnetization provided on the coating.

4. In combination, a cylinder, a magnetizable coating disposed on the surface of the cylinder, means for rotating the cylinder on its axis, a coil for producing signals in accordance with the pattern of magnetization provided on the coating, a first block for supporting the coil, a second block for supporting the first block, means extending through the second block and in pressing relationship with the first block to adjust the position of the first block radially with respect to the periphery of the cylinder, means extending through the second block and in pressing relationship with the first block to adjust the position of the first block tangentially with respect to the periphery of the cylinder, a third block for supporting the second block, and means extending through the third block and in pressing relationship with the second block to adjust the position of the second block angularly with respect to the periphery of the cylinder.

5. In combination, a cylinder assembly, said cylinder assembly including a first wheel having a first diameter and a second wheel having a second diameter different from said first diameter, means for supporting said cylinder assembly such that said first and said second wheels have a common axis of rotation, means for rotating said cylinder assembly about said axis of rotation, a magnetizable coating disposed upon curved surfaces of said wheels, a plurality of magnetic head assemblies held by said supporting means in cooperative relationship with said magnetizable coating, each magnetic head assembly including a magnetic head responsive to the pattern of magnetization provided upon said coating, means in said magnetic head assembly for adjusting the position of said magnetic head in a direction tangential to the periphery of one of said wheels, means in the magnetic head assembly for adjusting the position of the magnetic head in a direction radial to the periphery of one of said wheels, and means in the magnetic head assembly for adjusting the position of the magnetic head in an angular direction about the periphery of one of said wheels.

6. In combination a cylinder assembly including a first cylinder having a first diameter and a second cylinder having a second diameter different from said first diameter, said first and said second cylinders being mounted upon a common axis of rotation, a magnetizable coating disposed upon curved surfaces of said first and said second cylinders, means for rotating said cylinder assembly about said common axis of rotation, means positioned adjacent to the periphery of said wheels to produce signals in accordance with patterns of magnetization provided upon said coating, means for adjusting the position of said signal producing means radially with respect to said cylinder assembly, means for adjusting the position of said signal producing means tangentially with respect to said cylinder assembly, and means for adjusting the position of the signal producing means angularly with respect to said cylinder assembly.

References Cited in the file of this patent

UNITED STATES PATENTS

| | | |
|---|---|---|
| 1,366,617 | Wier et al. | Jan. 25, 1921 |
| 2,439,446 | Begun | Apr. 13, 1948 |
| 2,540,406 | Ranger | Feb. 6, 1951 |
| 2,540,654 | Cohen et al. | Feb. 6, 1951 |
| 2,546,829 | Mallina | Mar. 27, 1951 |
| 2,605,364 | Masterson | July 29, 1952 |
| 2,668,879 | D'Arcy | Feb. 9, 1954 |
| 2,680,785 | Franklin | June 8, 1954 |